US010418053B1

(12) United States Patent
Ehrlich

(10) Patent No.: US 10,418,053 B1
(45) Date of Patent: Sep. 17, 2019

(54) DISK-DRIVE WITH EFFICIENT COMMAND-REORDERING

(71) Applicant: KABUSHIKI KAISHA TOSHIBA, Tokyo (JP)

(72) Inventor: Richard M. Ehrlich, Saratoga, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/915,045

(22) Filed: Mar. 7, 2018

(51) Int. Cl.
*G11B 5/012* (2006.01)
*G11B 20/10* (2006.01)
*G11B 5/02* (2006.01)
*G06F 3/06* (2006.01)

(52) U.S. Cl.
CPC ........ *G11B 5/012* (2013.01); *G11B 20/10009* (2013.01); *G06F 3/061* (2013.01); *G06F 3/0659* (2013.01); *G06F 3/0674* (2013.01); *G06F 3/0676* (2013.01); *G06F 3/0677* (2013.01); *G11B 5/02* (2013.01)

(58) Field of Classification Search
None
See application file for complete search history.

(56) References Cited

U.S. PATENT DOCUMENTS

| 5,548,795 | A | * | 8/1996 | Au | G06F 3/0601 710/3 |
| 5,570,332 | A | | 10/1996 | Heath et al. | |
| 6,145,052 | A | * | 11/2000 | Howe | G06F 3/0613 710/43 |
| 6,272,565 | B1 | | 8/2001 | Lamberts | |
| 6,553,454 | B1 | * | 4/2003 | Harada | G06F 3/0601 710/52 |
| 6,925,539 | B2 | * | 8/2005 | Mowery | G06F 3/0601 710/244 |
| 8,069,305 | B2 | | 11/2011 | Manczak et al. | |
| 2003/0220896 | A1 | * | 11/2003 | Gaertner | G06F 3/0601 |
| 2006/0106980 | A1 | * | 5/2006 | Kobayashi | G06F 3/0611 711/113 |
| 2007/0130391 | A1 | * | 6/2007 | Aihara | G11B 21/12 710/52 |
| 2009/0113147 | A1 | * | 4/2009 | Murai | G06F 3/0613 711/154 |
| 2009/0292866 | A1 | * | 11/2009 | Aida | G06F 3/0617 711/112 |

(Continued)

*Primary Examiner* — Tan X Dinh
(74) *Attorney, Agent, or Firm* — Kim & Stewart LLP

(57) ABSTRACT

A storage device includes a disk, a head configured to write data to and read data from the disk, and a controller. The controller is configured to, for each of a plurality of unexecuted commands, carry out a calculation of an amount of time that is required for the head to start accessing the disk to begin execution of the non-executed command upon completion of a currently-executed command, until the earlier of i) a number of unexecuted commands for which the calculation has been carried out reaches a threshold value or ii) the completion of the currently-executed command, select a next command to be executed from one or more unexecuted commands for which the calculation has been carried out, based on the calculated amount of time for each of the one or more unexecuted commands, and execute the selected next command.

22 Claims, 10 Drawing Sheets

(56) References Cited

U.S. PATENT DOCUMENTS

| | | | |
|---|---|---|---|
| 2010/0077175 A1* | 3/2010 | Wu ....................... | G06F 3/0611 |
| | | | 711/172 |
| 2014/0006707 A1* | 1/2014 | Bandic .................... | G06F 12/08 |
| | | | 711/113 |
| 2016/0299686 A1 | 10/2016 | Nagashima et al. | |
| 2017/0039002 A1* | 2/2017 | Myouga ................ | G06F 3/0659 |

* cited by examiner

| GROUP 0 | GROUP 1 | GROUP 2 | GROUP 3 | GROUP 4 |
|---------|---------|---------|---------|---------|
| C | A | B | E | H |
| K | D | M | F | L |
| N | G |   | I | O |
|   | J |   | P |   |
|   |   |   |   |   |

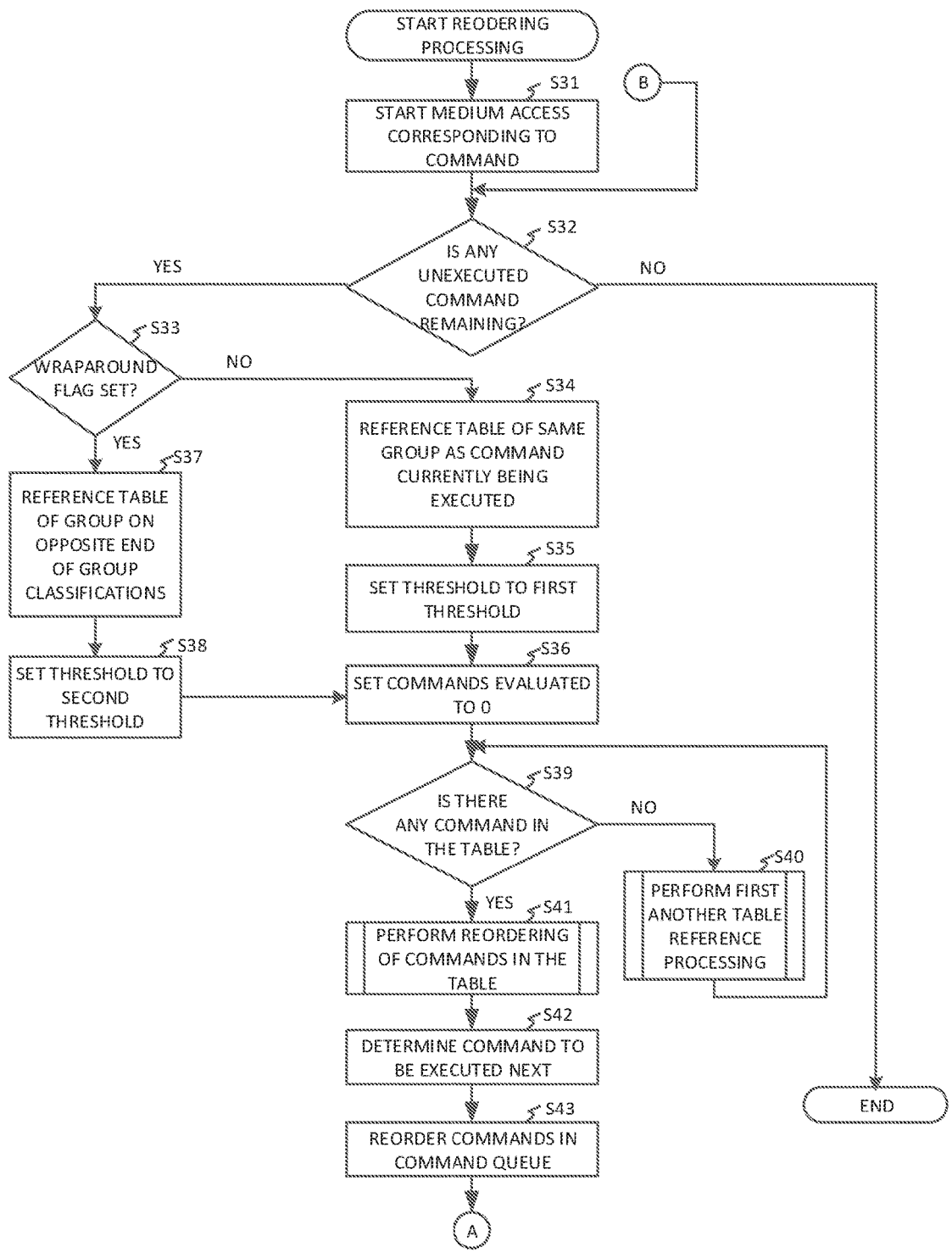

FIG. 11

| GROUP 0 | GROUP 1 | GROUP 2 | GROUP 3 | GROUP 4 |
|---------|---------|---------|---------|---------|
| B       | A       | D       |         |         |
| C       |         | G       |         |         |
| E       |         |         |         |         |
| F       |         |         |         |         |
|         |         |         |         |         |
|         |         |         |         |         |
|         |         |         |         |         |

FIG. 12

PHYSICAL ADDRESS, LBA

0 → ... 11

| GROUP 0 | | GROUP 1 | | GROUP 2 | | GROUP 3 | | GROUP 4 | |
|---------|---|---------|---|---------|---|---------|---|---------|---|
| FRONT AREA | REAR AREA | FRONT AREA | REAR AREA | FRONT AREA | REAR AREA | FRONT AREA | REAR AREA | FRONT AREA | REAR AREA |
| R1 | R2 | R1 | R2 | R1 | R2 | R1 | R2 | R1 | R2 | ically illustrating an
DISK-DRIVE WITH EFFICIENT COMMAND-REORDERING

BACKGROUND

In a storage device including a magnetic disk, a controller of the storage device typically receives commands such as write commands and read commands from a host and executes the received commands, e.g., accesses the magnetic disk for writing data and reading data. Each command sent from the host typically includes a logical address (representing a logical location) or a physical location of the magnetic disk to designate a target position of the disk to be accessed. The controller causes a head to be positioned at the target position as the magnetic disk is rotating, such the head can write data to or read data from the target position of the magnetic disk.

When the host sends commands designating different target positions randomly, it is inefficient to execute the commands in the order in which the controller receives the commands, because the head has to repeatedly move back and forth along the head's stroke toward the different target positions, and then has to wait for the rotation of the magnetic disk until the head is above the current target positions. Theoretically, it would be ideal to consider all orders of executing the commands and execute them in accordance with a most efficient order (i.e., an optimal order). However, the significant number of computations required to determine the optimal order and the associated amount of time required for the computations generally prevent the consideration of all orders. This is especially true when the number of commands is very large, because the number of computations increases as the number of commands increases. For example, if the number of non-executed commands is N, the number of possible command orderings will be N!

Another scheme for determining the order of executing commands employs a "nearest neighbor" algorithm. According to this algorithm, a command that requires a least amount of time to start executing is selected as the next command to be executed. Although this algorithm may not lead to the most efficient order, the algorithm can save a large amount of computation and enable the storage device to make a good choice of the next command to be executed while executing a current command. For example, if the number of non-executed commands is N, the number of possible commands that can be the next command is N. However, even when the "nearest neighbor" algorithm is applied, the number of computations required to determine the next command may become too large for a large number of non-executed commands.

SUMMARY

According to an embodiment, a storage device includes a disk, a head configured to write data to and read data from the disk, and a controller. The controller is configured to, for each of a plurality of unexecuted commands, carry out a calculation of an amount of time that is required for the head to start accessing the disk to begin execution of the non-executed command upon completion of a currently-executed command, until the earlier of i) a number of unexecuted commands for which the calculation has been carried out reaches a threshold value or ii) the completion of the currently-executed command, select a next command to be executed from one or more unexecuted commands for which the calculation has been carried out, based on the calculated amount of time for each of the one or more unexecuted commands, and execute the selected next command.

According to an embodiment, a method of operating a storage device including a disk and a head configured to write data to and read data from the disk, includes the following steps. Those steps are carrying out calculation of an amount of time that is required for the head to start accessing the disk to begin execution of the unexecuted command upon completion of a currently-executed command, with respect to one or more unexecuted commands, until the earlier of i) a number of unexecuted commands for which the calculation has been carried out reaches a threshold or ii) the completion of the currently-executed command; selecting a next command to be executed from one or more unexecuted commands for which the calculation has been carried out, based on the calculated amount of time for each of the one or more unexecuted commands; and executing the selected next command.

According to an embodiment, a non-transitory computer readable medium comprises instructions to be executed in a processing device to cause the processing device to carry out a method of operating a storage device including a disk and a head configured to write data to and read data from the disk. The method includes the following steps: carrying out calculation of an amount of time that is required for the head to start accessing the disk to begin execution of the unexecuted command upon completion of a currently-executed command, with respect to one or more unexecuted commands, until the earlier of i) a number of unexecuted commands for which the calculation has been carried out reaches a threshold or ii) the completion of the currently-executed command; selecting a next command to be executed from one or more unexecuted commands for which the calculation has been carried out, based on the calculated amount of time for each of the one or more unexecuted commands; and executing the selected next command.

BRIEF DESCRIPTION OF THE DRAWINGS

FIGS. 5A and 5B are flowcharts illustrating an example of a procedure of reordering processing of commands, according to an embodiment.

FIG. 7 is a flowchart illustrating a detailed procedure for reordering of commands included in a table being referred to.

FIG. 11 illustrates another example of commands arranged according to group classification, according to an embodiment.

FIG. 12 schematically illustrates an example of a method for determining a table reference direction according to a second embodiment.

DETAILED DESCRIPTION

The embodiments of a disk device and a controlling method of the disk device will be explained below in detail with reference to the accompanying drawings. The present invention is not limited to the following embodiments.

First Embodiment

Figure 1:
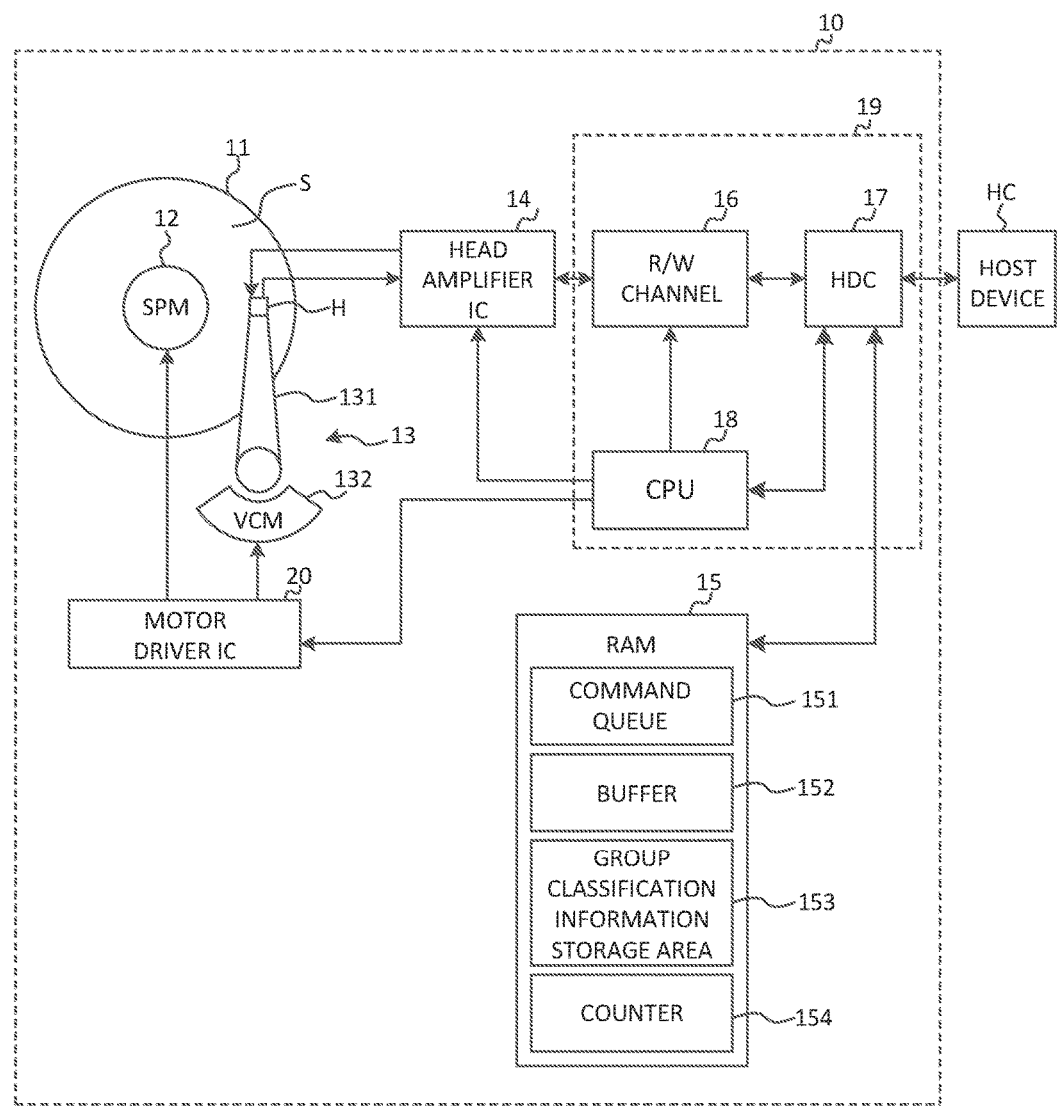
FIG. 1 is a block diagram schematically illustrating an example of an outline configuration of a disk device according to a first embodiment.

FIG. 1 is a block diagram schematically illustrating an example of an outline configuration of a disk device according to a first embodiment. A hard disk drive (HDD) and the like can be exemplified as the disk device.

A disk device 10 includes a disk 11, a spindle motor 12, a head stack assembly (hereinafter, referred to as an HSA) 13, a head amplifier integrated circuit (hereinafter referred to as a head amplifier IC) 14, a random access memory (hereinafter referred to as a RAM) 15, a read/write channel (hereinafter referred to as an R/W channel) 16, a hard disk controller (hereinafter referred to as an HDC) 17, a central processing unit (hereinafter referred to as a CPU) 18, which is an example of a processor, and a motor driver IC 20.

The disk 11 has a recording surface S, on which data is recorded, and is rotatively driven by the spindle motor 12. A plurality of disks 11 may be included in the disk device 10. Each disk may have up to two recording surfaces; one on each side of the disk. Furthermore, a physical address, which is position information indicating a physical position on the recording surface S, is established for each recording location of the recording surfaces S included in the disk device 10. The physical address is assigned, for example, in units of a head, a cylinder, and a sector. The head indicates which head (of the one or more heads) contained in the HSA 13. The cylinder indicates which track (of the many tracks containing data for each head). The sector indicates which sector (of the many sectors on each track). Thus, physical addresses indicating head, cylinder, and sector define the location of data in the three dimensions of a cylinder coordinate system: head for the vertical dimension, cylinder for the radial dimension, and sector for the angular dimension. The spindle motor 12 is driven by current (or voltage) supplied from the motor driver IC 20.

The HSA 13 has a one or more heads H, each with a head suspension 131, and a voice coil motor (hereinafter referred to as a VCM) 132. The head H is provided for each of the recording surfaces S of the disk 11. Each head H has a write head used to write data onto the disk 11 and at least one read head used to read data from the disk 11.

The head suspension 131 supports the head H and is provided for each of the heads H. The VCM 132 is driven by current (or voltage) supplied from the motor driver IC 20. The head suspension 131 and the VCM 132 are included in an actuator. The actuator controls movement of the head H supported by the head suspension 131 to a particular position above the recording surface S of the disk 11 by driving the VCM 132. With this configuration of the HSA 13, the head H can move in a radial direction of the recording surface S of the disk 11. In some embodiments, each head will have an associated additional actuator. The actuator (not shown in FIG. 1) could be on the suspension, at the gimbal between the suspension and the slider, or even on the slider, and can move the R/W head radially a small distance. Such actuators are generally referred to as dual-stage actuators, and enable the servo system to attain more accurate tracking control.

The head amplifier IC 14 supplies, to the head H, write signals (current) based on write data input from the R/W channel 16. Furthermore, the head amplifier IC 14 amplifies read signals output from the head H (i.e., the read data read from the disk 11 by the head H) and transmits the amplified signals to the R/W channel 16.

The RAM 15 is used as a temporary storage area and includes a volatile memory, such as a dynamic RAM (DRAM) or a static RAM (SRAM). The RAM 15 includes a command queue 151, a buffer 152, a group classification information storage area 153, and a counter 154. The command queue 151 queues a command received from a host device HC. In a state immediately after the disk device 10 is activated, the command queue 151 typically does may not store any commands. In a state in which reordering processing, which will be described below, has not been performed, the command queue 151 stores commands from the host device HC in the order of receipt therefrom. Furthermore, in accordance with the reordering processing, the commands in the command queue 151 are reordered. When disk access according to a command in the command queue 151 is completed, the command is removed from the command queue 151.

The buffer 152 includes a write buffer and a read buffer. The two buffers may occupy two different portions of the buffer 152, or they might share the same space. The write buffer temporarily stores data to be written to the disk 11 (hereinafter, referred to as write data) in accordance with a command to write the write data to the disk 11 (hereinafter, referred to as a write command). The read buffer temporarily stores data read from the disk 11 (hereinafter, referred to as read data) in accordance with a command to read the read data from the disk 11 (hereinafter, referred to as a read command). The read buffer may also store data that has been read from the disk in anticipation of being later requested by the host (in a future read command).

Here, the write command includes, among logical sectors managed in the disk 11, a start logical block address (hereinafter, referred to as an LBA) and a write data length of logical sectors which are writing destinations of the write data. Furthermore, the read command includes, among logical sectors managed in the disk 11, a start LBA corresponding to a start sector which stores the read data to be read and a read data length of the logical sectors.

The group classification information storage area 153 stores information associated with a plurality of group classifications of groups of physical locations on the disk 11. In the present embodiment, an entire range of LBAs corresponding to the entire range of physical locations of the disk 11 is divided into a plurality of groups so that each sub-range of the LBA corresponds to one group of physical locations in the disk 11. In other words, the sub-ranges of the LBA do not overlap with each other. The group is used as a unit to perform the reordering processing. It is noted that, when a logical address, such as an LBA, is assigned to correspond to a physical address, the physical address may be used as an index instead of an LBA. The following descriptions are based on an assumption that a particular LBA is assigned to correspond to a particular physical address.

The counter 154 stores a number of commands that have been evaluated during command reordering processing, as described below.

Figures 2A, 2B:
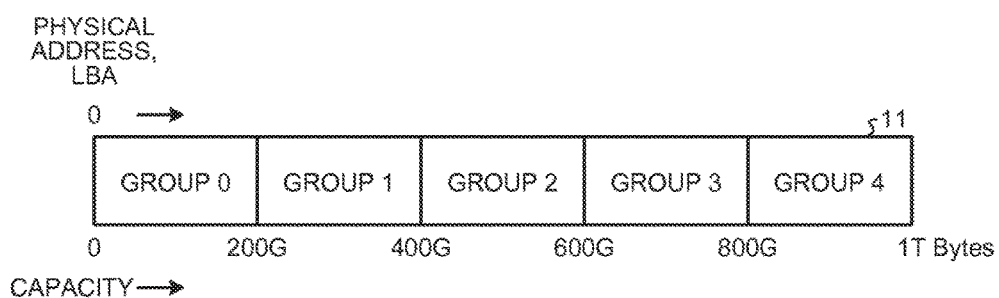
FIGS. 2A and 2B are diagrams illustrating a plurality of group classifications, according to an embodiment.

FIGS. 2A and 2B are diagrams illustrating a plurality of group classifications, according to an embodiment. FIG. 2A illustrates an example of grouping the storage area of the disk into groups of physical locations, and FIG. 2B illustrates an example of commands arranged according to the group classifications. FIG. 2A illustrates that the LBA range corresponding to the storage area of the disk 11 is divided into five groups, although the LBA range corresponding to the storage area of the disk 11 can be divided into any suitable number of such groups. For example, in one embodiment, when the storage capacity of the disk 11 is 1 T bytes, the storage area is divided into units of 200 G bytes, starting at the initial LBA. Consequently, the groups 0, 1, 2, 3, and 4 are generated in ascending order of the LBA range, where group 0 is typically disposed at the outer diameter (OD) of disk 11 and group 4 is disposed at the inner diameter (ID) of disk 11. The group classifications indicate to which group each of the commands A-P stored in the command queue 151 belong. In the example illustrated in FIG. 2B, the commands included in each group are listed in a table.

Returning to FIG. 1, the R/W channel 16 is a signal processing circuit. In the present embodiment, the R/W channel 16 encodes the write data input from the HDC 17 (i.e., carries out code modulation) and outputs the encoded data to the head amplifier IC 14. Furthermore, the R/W channel 16 decodes the read data transmitted from the head amplifier IC 14 (i.e., carries out code demodulation) and outputs the decoded data to the HDC 17.

The HDC 17 is a communication interface which enables communication with the host device HC. More specifically, when receiving the write command from the host device HC, the HDC 17 stores the write command in the command queue 151 of the RAM 15 and the write data in the buffer 152 of the RAM 15. After the writing processing, the HDC 17 returns a response to the host device HC. When receiving the read command from the host device HC, the HDC 17 stores the read command in the command queue 151 and returns, to the host device HC, the read data stored in the buffer 152 by the reading processing.

Furthermore, the HDC 17 performs classification processing of the command stored in the command queue 151. In the classification processing of the command, when receiving the command, the HDC 17 refers to a start LBA of the access destination included in the command and determines the group that includes the start LBA of the access destination in the range. Then, the HDC 17 records the determined result in the group classification information stored in the group classification information storage area 153. In other words, the HDC 17 classifies the command to be stored in the command queue 151 into groups based on the start LBA indicating the access destination. It is noted that the CPU 18 may execute firmware, which is stored in a non-transitory computer readable medium, e.g., the RAM 15, to carry out the classification processing of the command stored in the command queue 151.

Moreover, the HDC 17 executes the reordering processing of the queued commands. Generally, in the disk device 10, when the head H is moved to a desired track and a desired sector rotates to the position of the head H, the access to the disk 11 is performed. Here, the distance and the time to move the head H to the desired track are called a seek distance and a seek time, respectively, and the time while waiting for the desired sector to rotate to the position of the head H above the desired track is called a rotation waiting time. In order to accelerate reading or writing processing in the disk device 10, selecting a next command so as to minimize a sum of the seek time and the rotation waiting time is beneficial. It is noted that, the CPU 18 may execute firmware, which is stored in a non-transitory computer readable medium, e.g., the RAM 15, for the reordering processing of the queued commands.

To execute the next command, the reordering processing is executed to select the next command from a plurality of commands so that the access to the disk 11 is efficiently performed. In the reordering processing according to the present embodiment, as described below, the LBA range of the disk 11 is divided into a plurality of groups, where each group includes commands with LBA positions that are proximate each other. For the next command, each candidate from the same group as the command being executed is evaluated, followed by candidates from an adjacent group.

The CPU 18 is a main controller of the disk device 10 and executes various types of processing, such as control processing to write the write data and to read the read data by the head H, and servo control processing to control the position of the head H above the recording surface S of the disk 11. It is noted that the CPU 18 executes the above various types of processing by executing a program stored in a nonvolatile storage medium, such as a read only memory (ROM) (not illustrated), a programmable read only memory (PROM) (not illustrated), a flash chip (not illustrated), and/or the disk 11.

The motor driver IC 20 supplies current or voltage to the spindle motor 12 and drives the spindle motor 12 at a particular rotating speed. Furthermore, the motor driver IC 20 supplies the current or voltage designated by the CPU 18 to the VCM 132 and drives the actuator.

In the present embodiment, the R/W channel 16, the HDC 17, and the CPU 18 are incorporated onto an integrated circuit 19 called a system on chip (SoC), which is a chip integrating all of these components. The integrated circuit 19 functions as a controller in the broad sense of the term.

Next, a controlling method of the disk device 10 having the above-described configuration will be described. In the following descriptions, the group classification processing of the command received from the host device HC and the reordering processing of received commands will be described.

<Group Classification Processing of the Command>

Figure 3:
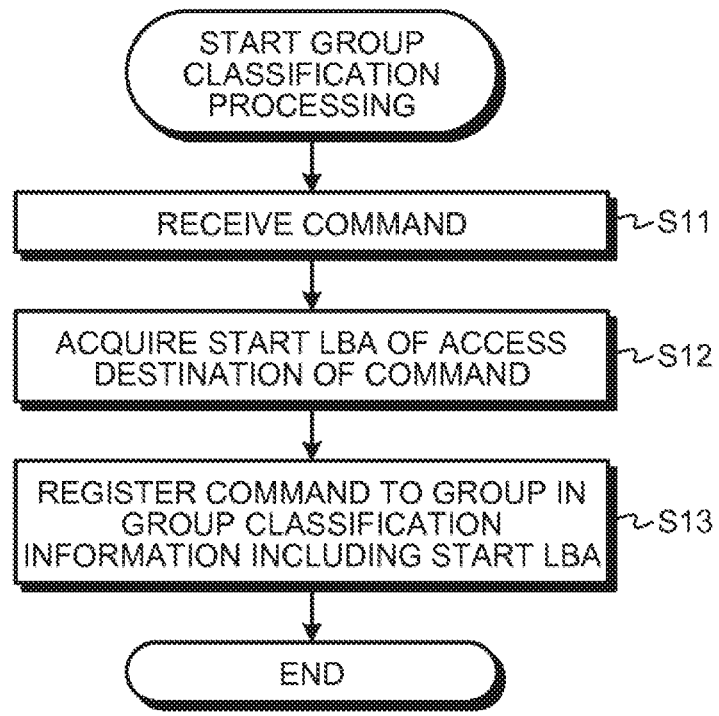
FIG. 3 is a flowchart illustrating an example of a procedure of group classification processing of a command, according to an embodiment.

FIG. 3 is a flowchart illustrating an example of a procedure of the group classification processing of a command, according to an embodiment. First, when receiving a command from the host device HC (S11), the HDC 17 stores the command in the command queue 151. When the command is a write command, the write data is stored in the buffer 152. Furthermore, the HDC 17 acquires the start LBA of the access destination of the received command (S12). Then, the HDC 17 associates the command with a particular group from a plurality of group classifications, based on the group classification that includes the acquired start LBA (S13). The group classification processing of the command then ends.

Figure 4:
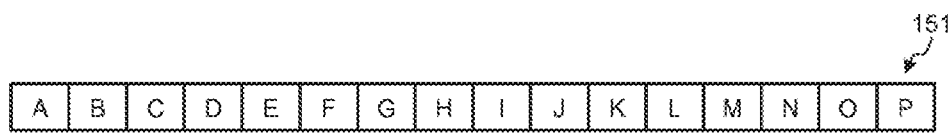
FIG. 4 schematically illustrates an example of commands stored in a command queue, according to an embodiment.

FIG. 4 schematically illustrates an example of commands stored in the command queue 151, according to an embodiment. When receiving the command from the host device HC, the HDC 17 stores the command in the command queue 151 in order of receipt, as shown in FIG. 4. Here, the commands are received in the order of A to P.

Furthermore, the result of performing the group classification processing illustrated in FIG. 3 to the commands stored in the command queue 151 is illustrated in FIG. 2B. For example, FIG. 2B illustrates that the commands classified in group 0 include the commands C, K, and N, the commands classified in group 1 include the commands A, D, G, and J, and so on.

<Reordering Processing of the Commands>

Figure 5B:
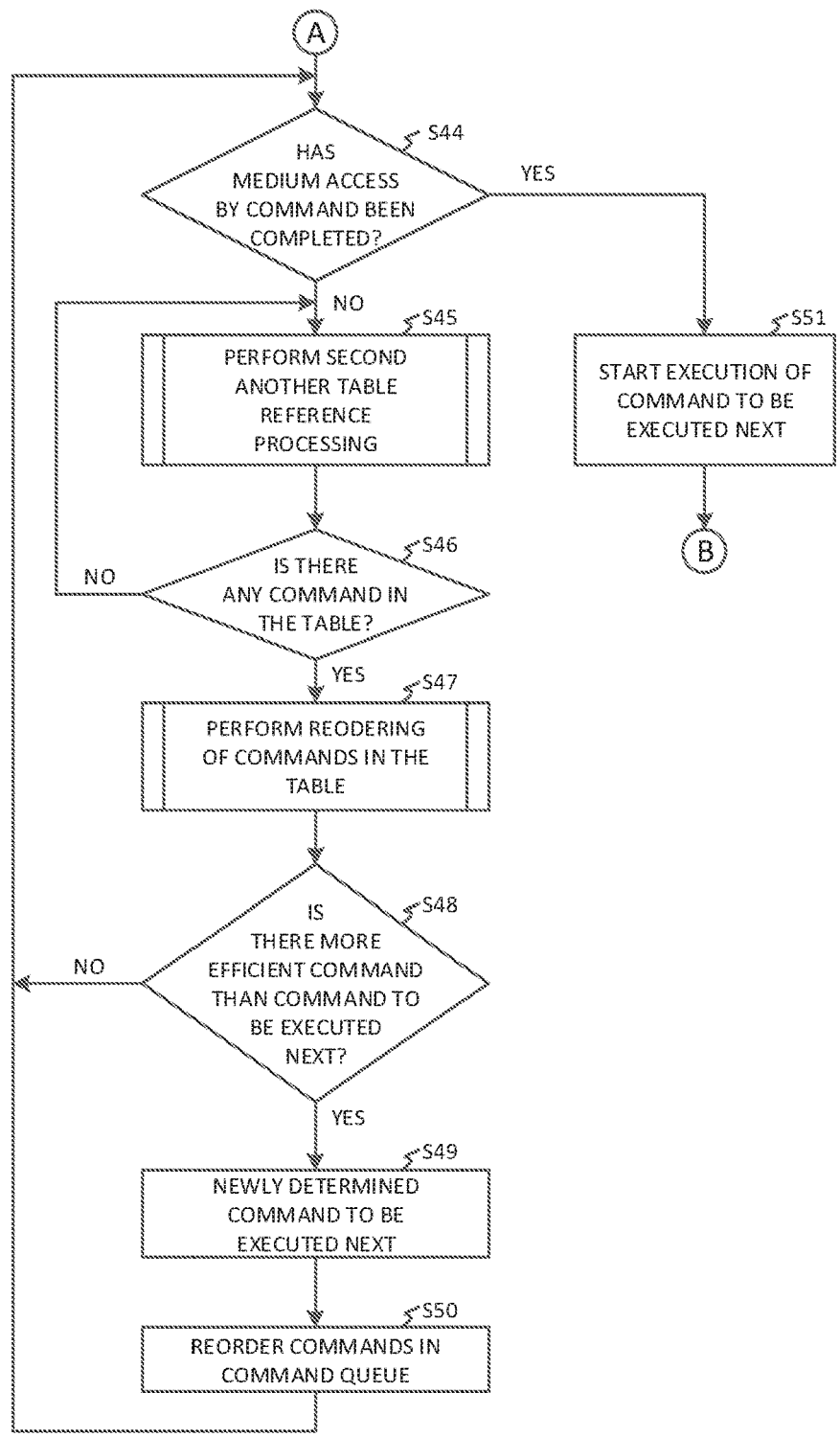

FIGS. 5A and 5B are flowcharts illustrating an example of a procedure of the reordering processing of commands. First, the HDC 17 extracts and begins execution of the first (e.g., oldest) command in the command queue 151. In this manner, medium access, i.e., access to the disk 11, based on the command is started (S31).

Next, the HDC 17 determines whether or not there is an unexecuted command in the command queue 151 (S32). When there are no unexecuted commands ("No" in S32), the processing is ended since there are no commands to be reordered. On the other hand, when there is an unexecuted command ("Yes" in S32), the HDC 17 determines whether or not a wraparound flag is currently set (S33). The wraparound flag is a flag indicating that the group from which selection is made of the next command to be executed is the group on the end (in LBA space) of the plurality of group classifications in the opposite direction to a group selection direction. The group selection direction is the predetermined direction in the logical address range in which groups in the plurality of group classifications are progressively selected to undergo the first another table reference processing (described below in conjunction with FIG. 6) and the second another table reference processing (described below in conjunction with FIG. 8). The group selection direction is also the predetermined radial direction in the physical position range of the disk (i.e., either from OD to ID, or from ID to OD) in which groups in the plurality of group classifications are progressively selected to undergo the first another table reference processing and the second another table reference processing. For example, in an embodiment in which the group selection direction is from the OD to the ID, and therefore is in the direction of increasing LBAs, when the wraparound flag is determined to be set ("Yes" in S33), the group from which selection is made of the next command to be executed is group 0. It is noted that in such an embodiment, the wraparound flag is typically set while the head H is positioned over a portion of disk 11 that corresponds to the last group in the group selection direction, i.e., group 4. Therefore, when the next command selected to be executed is in group 0, the head H will seek back across the disk 11 from the ID to the OD in order to execute that next command.

When the wraparound flag is not set ("No" in S33), to evaluate commands to potentially be the next command to be executed, the HDC 17 references the table of the group in the plurality of group classifications that includes the command currently being executed (S34). Then, the HDC 17 sets a threshold to a first threshold value that acts as a high limit (e.g., 500 or 1000) (S35). As set forth below, the first threshold value defines the maximum number of commands that are evaluated to potentially be the next command to be executed. The HDC 17 then resets a value of the counter 154, i.e., the HDC 17 sets the number of commands that have been evaluated to 0 (S36). When the wraparound flag is set ("Yes" in S33), in order to evaluate commands to potentially be the next command to be executed, the HDC 17 references the table of the group in the plurality of group classifications at the end of the plurality of group classifications in the opposite direction to the group selection direction (S37). For example, when the group 3 includes the command currently being executed and the group selection direction is in the direction of increasing group number (i.e., the tables are currently being progressively referenced from group 0 to group 4), the group 0 is referenced in step S37 for commands to be reordered. Then, the HDC 17 sets the threshold to a second threshold value that defines the maximum number of commands that are evaluated to potentially be the next command to be executed (S38). The second threshold value is lower than the first threshold (e.g., 100).

Next, the HDC 17 determines whether or not there is a command in the currently referenced table (S39), i.e., the table referenced in either step S37, S34, or S40. When there are no commands in the table ("No" in S39), the HDC 17 performs first another table reference processing (described in conjunction with FIG. 6), in which a table of the group adjacent to the currently referenced group is selected by the HDC 17 (S40). The group selected in step S40 is adjacent in LBA space (i.e., the logical address range of disk 11) to the currently referenced group and is in the group selection direction from the currently referenced group. Thereafter, the processing returns to S39.

Figure 6:
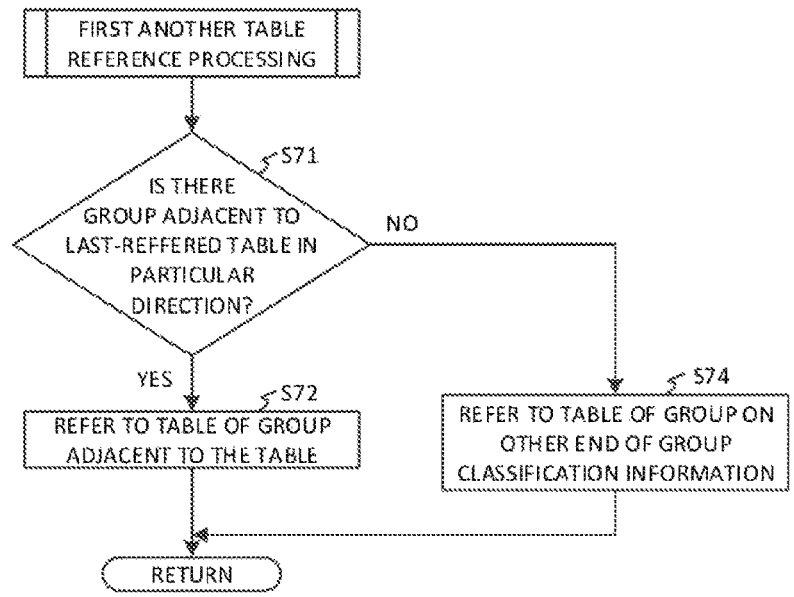
FIG. 6 is a flowchart illustrating an example of a procedure of first another table reference processing, according to an embodiment.

FIG. 6 is a flowchart illustrating an example of a procedure of the first another table reference processing, according to an embodiment. In such processing, first, the HDC 17 determines whether or not there is a group adjacent to the group being referenced in S34 or S37 in the group selection direction (S71). As noted, the group selection direction corresponds to radial movement of the head H that either increases the LBA (or the physical address), i.e., movement generally toward the ID of disk 11, or decreases the LBA (or the physical address), i.e., movement generally toward the OD of disk 11. Generally, the group selection direction is set in advance and remains constant throughout the reordering processing described in FIGS. 5A and 5B. In the example of the processing described in the present embodiment, the group selection direction is the radial direction that increases the LBAs associated with the position of the head H, i.e. from the OD of disk 11 to the ID of disk 11.

When there is a group that is adjacent in LBA space to the group currently being referenced, and this adjacent group is in the group selection direction from the group currently being referenced ("Yes" in S71), the HDC 17 references the table of this adjacent group (S72). For example, when the table being referenced in step S34 or S37 is any one of the groups 0 to 3 in FIG. 2A, there is an adjacent group in the group selection direction from the group whose table is being referenced. For example, when the table of group 0 is being referenced in S34 or S37, and the group selection direction is from OD to ID, the table of group 1 is referenced by HDC 17 in step S72. Then, the processing returns to FIG. 5A.

On the other hand, there may be no groups adjacent to the group currently being referenced in the group selection direction (No in S71). In other words, the group currently being referenced is on the end of the LBA range in the group selection direction. For example, in embodiments in which the group selection direction is in the direction of increasing LBAs on disk 11, i.e., from OD to ID, the group on the end of the LBA range in the group selection direction is group 4. When this is the case, the HDC 17 evaluates at least some commands to potentially be the next command to be executed that are associated with LBAs in a group that is not adjacent to the group currently being referenced. That is, the HDC 17 evaluates commands from the group on the opposite end of the plurality of group classifications in the group selection direction (e.g., group 0) from the group currently being referenced (e.g., group 4) (S74). For example, when the table currently being referenced for commands to be ordered is the group 4 in FIG. 2A, the group 4 includes the last LBA of the LBA range of the disk 11. Therefore, in the LBA order of the groups, the group 4 constitutes the group on the end. In other words, there is no group adjacent to the group currently being referenced in the direction of increasing LBAs. In this case, the table of the group 0, which is on the opposite end of the plurality of group classifications and includes the initial LBAs, is referenced in S74. Then, the processing returns to FIG. 5A.

In S39 of FIG. 5A, when there is a command in the table currently being referenced ("Yes" in S39), the HDC 17 performs reordering of the commands included in the currently referenced table (S41). More specifically, the HDC 17 calculates the processing time for each command in the table being referenced. Specifically, for each particular command in the table being referenced in step S41, the processing time is based on a time interval calculated to occur between when the command currently being executed is completed and the particular command in the table can begin to be executed. In one example, the processing time is calculated based on a last LBA of the command being executed and a start LBA of the particular command being evaluated as a candidate for the next command to be executed. Either or both of the seek time or/and the rotation waiting time is/are used to determine the processing time, as would be known by one of ordinary skill in the art.

Figure 7:
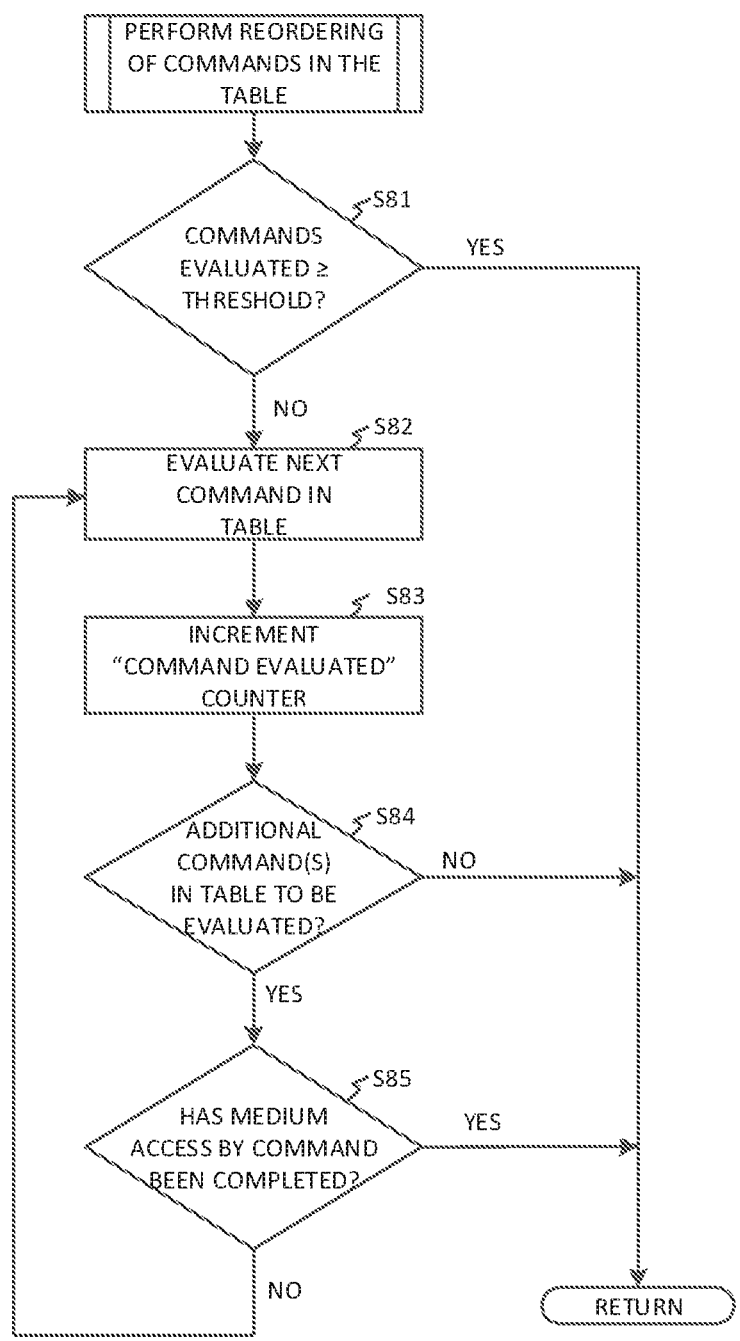

FIG. 7 illustrates a detailed procedure for the reordering of the commands included in the table carried out at step S41, according to an embodiment. In the processing, first, the HDC 17 determines whether or not the value of the counter 154 is greater than the current threshold value (i.e., the first or second threshold value set in step S35 or step S38) (S81). When the value of the counter is greater than the current threshold value ("Yes" in S81), the processing ends.

It is noted that when the current threshold value is set to the first threshold value, a relatively large number of commands can be evaluated to potentially be the next command to be executed, for example 500 or 1000. Consequently, a time-efficient next command is likely to be selected for execution after the currently executing command, since a large number of commands are evaluated. By contrast, when the wraparound flag is determined to be set in step S33 and the current threshold value is therefore set to the second threshold value, a relatively small number of commands are instead evaluated. Because selection of such commands begins in the group on the opposite end of the plurality of group classifications, the next command to be executed is most likely to be selected from the group on the opposite end of the plurality of group classifications. As a result, the next command to be executed is less likely to be a more time-efficient next command than when the number of commands that can be evaluated is large, but is more likely to be selected from the group on the opposite end of the plurality of group classifications. In this way, the probability of the head H moving to the far edge of the disk 11 is increased at the expense of executing one command that is potentially not the most time-efficient command available in all of the plurality of group classifications. Advantageously, implementation of the wraparound flag and the second threshold in this way encourages the position of the head H to sweep across most or all of the surface of disk 11 in the group selection direction when writing commands from the buffer 152 to the disk 11.

When the value of the counter is not greater than the current threshold value ("No" in S81), the HDC 17 selects a command in the currently referenced table, and calculates the processing time for the selected command assuming that the selected command is executed following the command currently being executed (S82). Here, the manner of selecting the command for which the processing time is calculated is not limited, and the selection can be carried out in any manner. For example, in some embodiments, the HDC 17 selects the command in an order listed in the table, or in an order of LBA. Then, the HDC 17 increments the value of the counter 154 (S83). Next, the HDC 17 determines whether or not there are any other commands in the currently referenced table, i.e., commands that have not been evaluated yet (S84). When there is no other command in the table ("No" in S84), the processing ends. When there is a command that has not been evaluated ("Yes" in S84), the HDC 17 determines whether or not the medium access in accordance with the current command being executed is completed (S85). When the medium access is completed ("Yes" in S85), the processing ends, and when the medium access is not completed ("No" in S85), the processing returns to S82 for evaluating further commands in the table.

Returning to FIG. 5A, after step S41, the HDC 17 determines, as the command to be executed next, a command that can be executed in the shortest time among the commands in the table that have been evaluated (S42). Then, the HDC 17 performs the reordering of the commands in the command queue 151 so that the command to be executed next is set to be executed next when the command that is currently being executed completes its execution before another such determination is made (S43).

In the embodiment illustrated in FIG. 5A, steps S42 and S43 are performed after a plurality of commands have been evaluated in step S41. Alternatively, steps S42 and S43 can be performed whenever a command that is evaluated in step S41 is determined to be the command that can be executed in the shortest time among the commands in the table that have been evaluated. The calculation of the processing time for commands in step S41 then continues.

Thereafter, as shown in FIG. 5B, the HDC 17 determines whether or not the medium access associated with the command currently being executed has been completed (S44). The medium access time associated with executing the command currently being executed varies based on the location of the start of the access destination and on the data length of the access destination. For example, when the data length of the access destination is long or if the start of the data requires a long seek or a long rotational time from the end of the previous data, the medium access by the command currently being executed takes a relatively long time. On the other hand, when the data length of the access destination is short and the start of the data requires a short seek and a short rotational time, the medium access associated with executing the command takes a relatively short time.

When the medium access has not been completed ("No" in S44), the HDC 17 performs second another table reference processing (S45).

Figure 8:
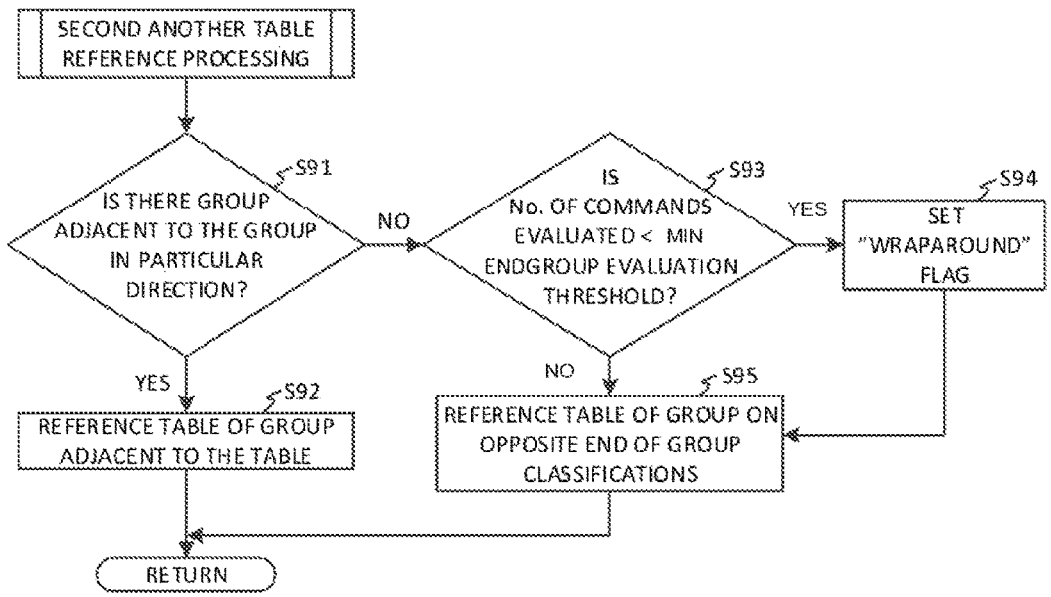
FIG. 8 is a flowchart illustrating an example of a procedure of second another table reference processing, according to an embodiment.

FIG. 8 is a flowchart illustrating an example of a procedure of the second another table reference processing, according to an embodiment. First, the HDC 17 determines whether or not there is a group adjacent to the last-referenced table in the group selection direction (S91). Here, when the second another table reference processing is executed for the first time, the last-referenced table is the table which is most recently referenced among the tables that have been referred to in S34 and S40. Furthermore, when the second another table reference processing is executed for the second time, the last-referenced table is the table which has been referenced in the previous second another table reference processing.

When there is a group adjacent to the last-referenced table ("Yes" in S91), the HDC 17 refers to the table of the group adjacent to the last-referenced table (S92). On the other hand, when there are no groups adjacent to the last-referenced table in the group selection direction ("No" in S91), the HDC 17 determines whether or not the value of the counter, i.e., the number of commands that have been evaluated, is less than a minimum end group evaluation threshold (S93). The minimum end group evaluation threshold is a value indicating a minimum number of commands to be evaluated in an end group of the plurality of group classifications without setting the wraparound flag. Thus, when the value of the counter is less than the minimum end group evaluation threshold ("Yes" in S93), the HDC 17 sets the wraparound flag (S94), and the processing proceeds to S95, in which commands are no longer evaluated from the current group in the plurality of group classifications, and are instead evaluated from a group at the end (in the direction opposite the group selection direction) of the plurality of group classifications. When the value of the counter is not less than the threshold ("No" in S93), the processing proceeds to S95. In S95, the HDC 17 references the table of the end group in the plurality of group classifications that is disposed on the opposite end of the plurality of group classifications (in LBA space) (S95). After S92 or S95, the processing returns to FIG. 5B.

Thereafter, the HDC 17 determines whether or not there are any remaining commands in the table being referenced in FIG. 5B (S46). When there is no command in the table (No in S46), the processing returns to S45, in which a different group in the plurality of group classifications is referenced for commands to evaluate. On the other hand, when there is a command in the table being referenced (Yes in S46), the HDC 17 performs the reordering of the commands included in the table (S47) in a similar manner to S41. It is noted that, when the second another table reference processing of S45 is performed for the first time after the counter 154 has been set to 0, the table for which commands are reordered is the table of the group determined by performing the second another table reference processing, which is different than the table for which the reordering of commands is performed in S41. Furthermore, when the second another table reference processing of S45 is performed for the second time or later after the counter 154 has been set to 0, the above table is the table of the group determined by performing the second another table reference processing, which is a different table than the table of the group which has been referenced in a previous second another table reference processing. Thus, a different table is referenced with each instance of the performance of second another table reference processing that is performed after the counter 154 has been set to 0. The HDC 17 calculates the processing time of each command in the table being referenced, where the command is assumed to begin to be executed following the command being executed. The processing time is based on a time interval calculated to occur between when the command currently being executed is completed and the command in the table being referenced can begin to be executed. Either or both of the seek time or/and the rotation waiting time can be used to determine the processing time.

Next, the HDC 17 determines whether or not there is a more efficient command that has been evaluated than the command to be executed next among the reordered commands (S48). Here, the term "more efficient" means that the processing time is shorter. When there is a more efficient command than the command to be executed next (Yes in S48), the HDC 17 selects the more efficient command as the command to be executed next (S49). However, when there is a plurality of more efficient commands that are have been evaluated as more efficient than the command to be executed next, the HDC 17 selects the most efficient command among the more efficient commands. Then, the HDC 17 performs the reordering of the commands in the command queue 151 so that the selected command is executed next after the command currently being executed (S50). Thereafter, the processing returns to S44. Also, when there are no more-efficient commands than the command to be executed next (No in S48), the processing also returns to S44.

When the medium access by the command executing in S44 has been completed (Yes in S44), the HDC 17 starts execution of the command selected to be executed next (S51). Then, the processing returns to S32. In accordance with the above exemplified procedure, the reordering processing is performed.

Next, a specific example of the reordering processing will be described. Here, what is described is an instance in which each group in the plurality of group classifications includes a command and an instance in which the group including the command being executed does not include any other command.

<Instance in which Each Group in the Plurality of Group Classifications Includes a Command>

Figure 9A:
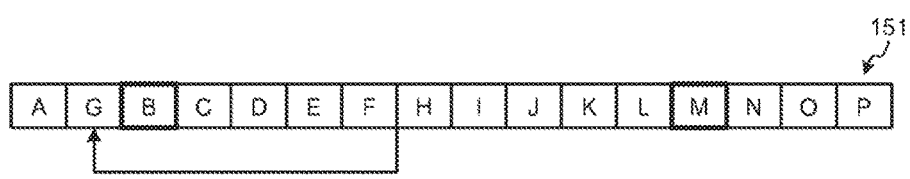
FIGS. 9A and 9B are diagrams schematically illustrating an example of a command state in the command queue, according to an embodiment.
Figure 9B:
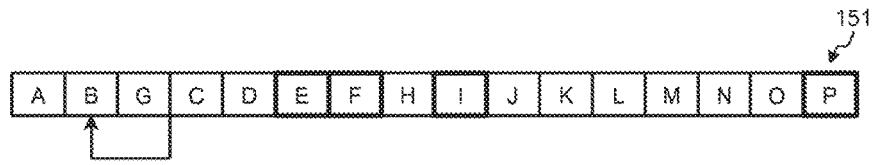

FIGS. 9A and 9B schematically illustrate an example of the command state in the command queue 151, according to an embodiment. It is assumed that the commands A to P are stored in order in the command queue 151 as illustrated in FIG. 4, and the respective commands are classified into the groups as illustrated in FIG. 2B. Thus, the command A is executed first, since the command A is the first command in the command queue 151 in FIG. 4 at the time that reordering begins. While the command A is being executed, the HDC 17 performs the reordering processing.

Initially in the reordering process, the table of the group 1 is referenced, since FIG. 2B shows that the command A belongs to the group 1. Furthermore, the table of the group 1 includes the other commands D, G, and J. Therefore, the HDC 17 calculates the processing time of each of the commands in the group 1, one by one, except for the command A, which is the time interval associated with each command in group 1 that occurs between when execution of the command A is completed and execution of that particular command in group 1 can begin. The HDC 17 selects the most efficient command among the commands that have been evaluated (i.e., for which the processing time has been calculated). Here, for example, it is assumed that the command G is determined as the command to be executed next. Consequently, the command G is moved between the commands A and B in the command queue 151 as illustrated in FIG. 9A.

When the above calculation of processing times completes, if the medium access associated with the command being executed (i.e., command A) has completed, the command G, which has been determined to be the next command to be executed, is then executed. On the other hand, when the above calculation of processing times completes, and the medium access associated with the command being executed has not yet completed, the second another table reference processing (illustrated in FIG. 8) is executed. Then, the reordering processing including the commands in the table of the adjacent group in the group selection direction is performed, in this case group 2. The commands on which the reordering processing is performed are the commands B and M, illustrated with thick frames in FIG. 9A. Then, it is determined whether there is a more efficient command to execute next among the commands evaluated from group 2 than the command currently selected from group 1 to be executed next when the execution of command A is completed.

When all of the commands in the group 2 are less efficient than the command G to be executed next, the command G remains as the command selected to be executed next, as illustrated in FIG. 9A. On the other hand, when a command in the group 2 (e.g., command B) is more efficient to be executed next than the command G, the command B is selected as a new command to be executed next. Consequently, the command B is moved between commands A and G in the command queue 151 as illustrated in FIG. 9B.

Hereinafter, the reordering processing of the commands is performed in the order of the group 3, the group 4, and the group 0 of FIG. 2B until the medium access by the command A currently being executed is completed. For example, when the reordering processing is performed in the table of the group 3, the commands E, F, I, and P with the thick frames in FIG. 9B are the reordering targets, i.e., commands that are evaluated to potentially be the next command executed after completion of command A. In the below examples, the HDC 17 is described reordering positions of commands in the command queue 151. However, in practice, the HDC 17 may not move the commands in the command queue 151 and instead logically changes the order of the commands without physically moving the positions of the commands within the command queue 151.

<Instance in which the Group Including the Command being Executed does not Include any Other Command>

Figure 10A:
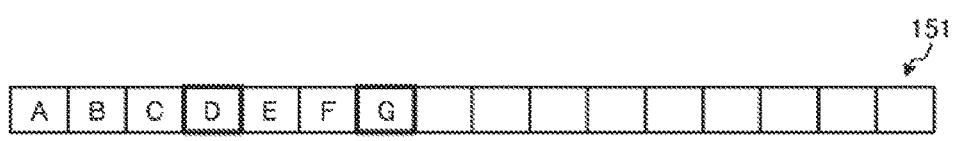
FIG. 10A to FIG. 10C are diagrams illustrating an example of a command state in the command queue, according to an embodiment.
Figure 10B:
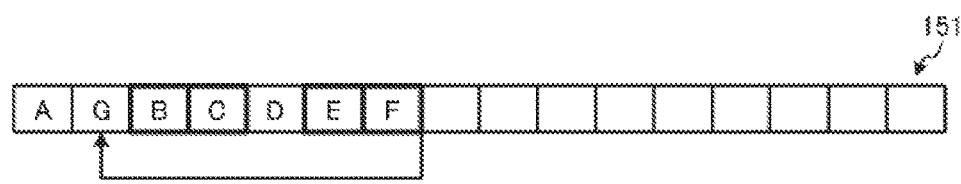
Figure 10C:
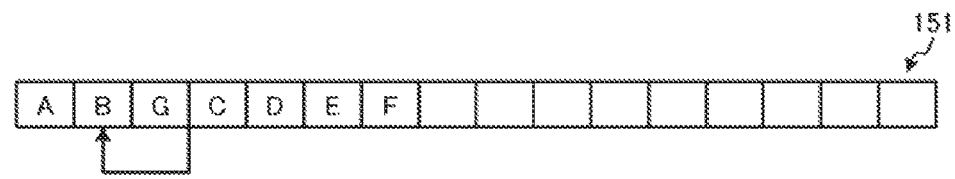

FIGS. 10A to 10C illustrate an example of a command state in the command queue 151, and FIG. 11 illustrates another example of commands arranged according to group classification, according to an embodiment. In the example, it is assumed that the commands A to G are stored in order in the command queue 151 as illustrated in FIG. 10A, and each are classified into the classification groups as illustrated in FIG. 11. The command A is executed first, since the command A is the first command stored in the command queue 151 in FIG. 10A. While the command A is executed, the HDC 17 performs the reordering processing.

The table of the group 1 is referenced, since FIG. 11 shows that the command A belongs to the group 1. In the example of FIG. 11, the table of the group 1 does not include any other command. Therefore, the HDC 17 executes the first another table reference processing illustrated in FIG. 6. Then, the HDC 17 references the table of the adjacent group 2 in the group selection direction, which in this embodiment is in the direction of increasing LBAs.

The commands D and G are included in the group 2 as illustrated in FIG. 11 (the reordering processing target commands D and G are illustrated with thick frames in FIG. 10A). Therefore, the HDC 17 calculates the processing time for each of the commands in the group 2 when that command is executed following the command A, and selects the most efficient command. Here, for example, it is assumed that command G is determined as the command to be executed next. Consequently, the command G is moved between the commands A and B in the command queue 151 as illustrated in FIG. 10B.

When the above processing is executed, if the medium access associated with the command A executed has been completed, the command G, which has been determined to be the command to be executed next, is executed. On the other hand, when the above processing is executed and the medium access associated with the command A has not been completed, the table of the group 3, which is adjacent to the group 2 in the group selection direction, is referenced. However, the group 3 also does not also include a command. Thus the group 4 is then referenced. However, the group 4 does not include a command, either. Because the group 4 has the last physical address of the storage area of the disk 11 in the group selection direction, the group 0, which has the initial LBAs in the address space of disk 11, is then referenced after the group 4. In the example of FIG. 11, the group 0 includes the commands B, C, E, and F (the reordering processing target commands B, C, E, and F are illustrated with thick frames in FIG. 10B). Therefore, the HDC 17 performs the reordering processing on the commands included in the group 0. Then, the HDC 17 determines whether or not there is a more efficient command than the command currently selected to be executed next when execution of the command A is completed.

When all of the commands in the group 0 are less efficient than the command G to be executed next, the command G remains as the command selected to be executed next as illustrated in FIG. 10B. On the other hand, when the command B in the group 0 is determined to be more efficient as the next executed command than the command G, the command B is selected as a new command to be executed next, replacing command G as the command selected to be executed next. Consequently, the command B is moved between the commands A and G in the command queue 151 as illustrated in FIG. 10C.

It is noted that, thereafter, the reordering processing of commands is performed in the order of the group 1, the group 2, and so on in FIG. 11 until the medium access by which the command A is currently being executed is completed.

It is noted that, in the above description, when referring to another table, the HDC 17 selects a group adjacent to the group currently being referenced in the group selection direction, in this case is in the direction of increasing LBA values. However, this is merely an example. In alternative embodiments, when the group selection direction is from ID to OD (i.e., from larger LBA values to lower LBA values), the HDC 17 may select an adjacent group in the direction of decreasing LBA values.

According to the first embodiment, the disk device 10 having the disk 11 and the controller (e.g., the HDC 17) queues commands from the host device HC and reorders the commands that designate an access location (physical location corresponding to an LBA) that is in the vicinity of the command currently being executed. Thus, as compared to reordering all commands in the command queue 151 as targets, the number of the commands evaluated as the potential reordering targets is limited. Consequently, it is possible to reduce overhead of the controller and degradation of performance.

Furthermore, the command that is selected as the next command to be executed is the command for which execution can be initiated after the shortest seek access time (or, seek access time plus rotational latency) from the last LBA associated with the command currently being executed. Because shorter access-times tend to be correlated with shorter seek-times (and thus, shorter seek-distances), it is possible to reduce power consumption of the disk device 10.

Moreover, according to the first embodiment, when the number of evaluated commands is less than the threshold ("Yes" in S93), the wraparound flag is set, such that the operation of referencing the table to select the second next command to be executed (i.e., a command to be executed after the next command) is started from the table of the group on the opposite end of the plurality of group classifications in S37. This situation can happen when the number of commands that have been evaluated in one or more groups that have been referenced is less than the minimum end group evaluation threshold. In such a case, it may not be efficient to continue evaluating commands included in the current group, since the current group will contain only a small number of commands. Instead, it may be better to move the head H back to a group on the opposite end of the LBA space (for example from the ID back to the OD), and execute commands in that group. This is because generally there are more commands to be executed in the group on the opposite end of the LBA space than in the current group, since the current group can only include fewer commands than the minimum end group evaluation threshold when the wraparound flag is set. Thus, when the wraparound flag is set, the currently referenced group includes a relatively small number of commands that can be evaluated (e.g., 30-50), while the group on the opposite end of the LBA space from the currently referenced group has typically not had commands executed for a longer time than the other groups of the disk 11. Consequently, shifting evaluation of commands from the currently referenced group to the group on the opposite end of the LBA space therefrom enables more efficient execution of commands to be performed. The present embodiment enables this wraparound to the opposite end of the LBA space from the currently referenced group by using the wraparound flag.

Further, in the present embodiment, the current threshold value is set to the first threshold value (S35) so that the number of commands that have been evaluated for the selection of the next command to be executed is sufficiently large. When the number of evaluated commands reaches the current threshold value, it is more likely that the command that requires the shortest processing time can be found among the commands that have been evaluated before the number of evaluated commands reaches the current threshold value during the reordering in S41. By setting the current threshold value to the first threshold value, unnecessary evaluation of too many commands can be avoided, and the drive can maintain gradual progress across the LBA space.

Moreover, when wraparound occurs in S38, the current threshold value is changed from the first threshold value to the second threshold value, which is smaller than the first threshold value. This change of the current threshold value is implemented because evaluating a relatively large number of commands after wraparound is more likely to result in selecting a command that is not included in the "wraparound group" (i.e., the group on the opposite end of the LBA space from the currently referenced group), and is instead included in a group farther from the opposite end of the LBA space. Consequently, the group or groups disposed at the opposite end of LBA space would be skipped over for evaluation of commands, which is not desirable.

It is noted that, the flowcharts illustrated in the above embodiments are examples. Therefore, the processing steps may not be performed in the flowcharts in exactly the order illustrated.

Furthermore, in the above described example, LBAs are generally each assigned so as to correspond to a physical address of the disk 11. However, the above described embodiments are also applicable to situations in which the LBAs are not assigned to a particular physical address of the disk 11. In such situations, by using address conversion information indicating the correspondence relation between the LBA and the physical address, the LBA is converted into the physical address, and the processing is executed.

In the above embodiments, the LBA range within which the command reordering processing is carried out is defined by the divisions of the LBA-range groups. In addition to or instead of limiting command reordering processing by the LBA-range groups, the LBA range that undergoes the herein-described command reordering processing may be limited based on the maximum or minimum LBA that has been reached during the current stroke of the head H from one of an ID and an OD to the other. For the sake of simplicity in describing the next example, it will be assumed that the current selected direction of the drive is from lower LBAs to higher LBAs. For this example, in an embodiment, the LBA range eligible to undergo the herein-described command reordering processing may be further limited to LBAs that are greater than a specified minimum LBA. That minimum LBA may be set equal to a value that is (for example) lower than the highest LBA selected for execution during the current pass across the LBA-space of the drive by a specified fraction (for example, 2%) of the total number of LBAs in the LBA-space.

In one example scenario, the group selection direction is from OD to ID and LBAs increase in value from OD to ID. According to the embodiment, in such a scenario, commands eligible for being evaluated for reordering are limited to those including LBAs that are no less the specified ratio (e.g., 2% of the total LBA range of the disk device) below the highest LBA value that has been selected thus far in the current pass across the stroke (i.e., since the last time that the wraparound flag has been set and the command reordering processing has changed from the OD to the ID). According to this embodiment, commands eligible for being evaluated for reordering are limited to those that are 1) further along in the group selection direction from the current command being executed or 2) only a short distance (in LBA values) in the opposite direction than the group selection direction from the current command being executed. As a result, the commands that are selected to be executed will generally trend in the group selection direction (in the above scenario from the OD to the ID), thereby causing the head H to generally track across a surface of disk 11 in the group selection direction as commands are executed. Even in these situations, it is possible to limit the commands to be evaluated, and the next command to be executed can be determined more efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a disk;
   a head configured to write data to and read data from the disk; and
   a controller configured to:
   for each of a plurality of unexecuted commands, carry out a calculation of an amount of time that is required for the head to start accessing the disk to begin execution of the non-executed command upon completion of a currently-executed command, until a first timing at which a number of unexecuted commands for which the calculation has been carried out reaches a threshold value when the first timing is earlier than a second timing at which the currently-executed command is completed, and until the second timing when the second timing is earlier than the first timing, select a next command to be executed from one or more unexecuted commands for which the calculation has been carried out, based on the calculated amount of time for each of the one or more unexecuted commands, and execute the selected next command.

2. The storage device according to claim 1, wherein each of the plurality of unexecuted commands designates a logical address within a logical address range that corresponds to a physical position range of the disk, and the controller is further configured to:

divide the logical address range into a plurality of sub-ranges, and carry out the calculation for each of the plurality of unexecuted commands that includes a logical address within a first sub-range of the plurality of sub-ranges before carrying out the calculation for an unexecuted command of the plurality of unexecuted commands that includes an address within another of the plurality of sub-ranges.

3. The storage device according to claim 2, wherein the controller is further configured to:

determine whether any sub-range of the plurality of sub-ranges is adjacent in the logical address range to the first sub-range in a predetermined direction with respect to the logical address range, when there is a sub-range that is adjacent to the first sub-range in the predetermined direction, select the adjacent sub-range, and when there is no sub-range that is adjacent to the first sub-range in the predetermined direction, set a flag indicating that the unexecuted commands on which the calculation of the amount of time is next carried out are included in a second sub-range that is disposed on an end of the logical address range in the opposite direction of the predetermined direction.

4. The storage device according to claim 3, wherein the controller is further configured to reduce the threshold value to a lower threshold value when the flag is set.

5. The storage device according to claim 3, wherein the controller is further configured to:

for each unexecuted command included in the sub-range that is adjacent to the first sub-range, carry out the calculation of the amount of time.

6. The storage device according to claim 3, wherein the controller is further configured to:

when the flag is set, for each unexecuted command included in the second sub-range, carry out the calculation of the amount of time.

7. The storage device according to claim 6, wherein the controller is further configured to:

select a third sub-range of the plurality of sub-ranges that is adjacent in the logical address range to the second sub-range in the predetermined direction with respect to the logical address space, and for each unexecuted command included in the third sub-range, carry out the calculation of the amount of time.

8. The storage device according to claim 2, wherein the first sub-range includes a logical address that is accessed as part of the execution of the currently-executed command.

9. The storage device according to claim 1, wherein the controller selects, as the command to be executed next, an unexecuted command that has the smallest calculated amount of time of the one or more non-executed commands for which the calculation has been carried out.

10. A method of operating a storage device including a disk and a head configured to write data to and read data from the disk, comprising:

carrying out calculation of an amount of time that is required for the head to start accessing the disk to begin execution of the unexecuted command upon completion of a currently-executed command, with respect to one or more unexecuted commands, until a first timing at which a number of unexecuted commands for which the calculation has been carried out reaches a threshold when the first timing is earlier than a second timing at which the currently-executed command is completed, and until the second timing when the second timing is earlier than the first timing;

selecting a next command to be executed from one or more unexecuted commands for which the calculation has been carried out, based on the calculated amount of time for each of the one or more unexecuted commands; and executing the selected next command.

11. The method according to claim 10, wherein each of the plurality of unexecuted commands designates a logical address within a logical address range that corresponds to a physical position range of the disk, and further comprising:

dividing the logical address range into a plurality of sub-ranges, and carrying out the calculation for each of the plurality of unexecuted commands that includes a logical address within a first sub-range of the plurality of sub-ranges before carrying out the calculation for an unexecuted command of the plurality of unexecuted commands that includes an address within another of the plurality of sub-ranges.

12. The method according to claim 11, further comprising:

determining whether any sub-range of the plurality of sub-ranges is adjacent in the logical address range to the first sub-range in a predetermined direction with respect to the logical address range, when there is a sub-range that is adjacent to the first sub-range in the predetermined direction, selecting the adjacent sub-range, and when there is no sub-range that is adjacent to the first sub-range in the predetermined direction, setting a flag indicating that the unexecuted commands on which the calculation of the amount of time is next carried out are included in a second sub-range that is disposed on an end of the logical address range in the opposite direction of the predetermined direction.

13. The method according to claim 12, further comprising reducing the threshold value to a lower threshold value when the flag is set.

14. The method according to claim 12, further comprising, for each unexecuted command included in the sub-range that is adjacent to the first sub-range, carrying out the calculation of the amount of time.

15. The method according to claim 12, further comprising, when the flag is set, for each unexecuted command included in the second sub-range, carrying out the calculation of the amount of time.

16. The method according to claim 15, further comprising:

selecting a third sub-range of the plurality of sub-ranges that is adjacent in the logical address range to the second sub-range in the predetermined direction with respect to the logical address space, and for each unexecuted command included in the third sub-range, carrying out the calculation of the amount of time.

17. The method according to claim 11, wherein the first sub-range includes a logical address that is accessed as part of the execution of the currently-executed command.

18. A non-transitory computer readable medium comprising instructions to be executed in a processing device to cause the processing device to carry out a method of operating a storage device including a disk and a head configured to write data to and read data from the disk, the method comprising:

carrying out calculation of an amount of time that is required for the head to start accessing the disk to begin execution of the unexecuted command upon completion of a currently-executed command, with respect to one or more unexecuted commands, until a first timing at which a number of unexecuted commands for which the calculation has been carried out reaches a threshold when the first timing is earlier than a second timing at which the currently-executed command is completed, and until the second timing when the second timing is earlier than the first timing;

selecting a next command to be executed from one or more unexecuted commands for which the calculation has been carried out, based on the calculated amount of time for each of the one or more unexecuted commands; and executing the selected next command.

19. The non-transitory computer readable medium according to claim 18, wherein each of the plurality of unexecuted commands designates a logical address within a logical address range that corresponds to a physical position range of the disk, and the method further comprises:

dividing the logical address range into a plurality of sub-ranges, and carrying out the calculation for each of the plurality of unexecuted commands that includes a logical address within a first sub-range of the plurality of sub-ranges before carrying out the calculation for an unexecuted command of the plurality of unexecuted commands that includes an address within another of the plurality of sub-ranges.

20. The non-transitory computer readable medium according to claim 19, wherein the method further comprises:

determining whether any sub-range of the plurality of sub-ranges is adjacent in the logical address range to the first sub-range in a predetermined direction with respect to the logical address range, when there is a sub-range that is adjacent to the first sub-range in the predetermined direction, selecting the adjacent sub-range, and when there is no sub-range that is adjacent to the first sub-range in the predetermined direction, setting a flag indicating that the unexecuted commands on which the calculation of the amount of time is next carried out are included in a second sub-range that is disposed on an end of the logical address range in the opposite direction of the predetermined direction.

21. The storage device according to claim 3, wherein the controller is further configured to:

when there is no sub-range that is adjacent to the first sub-range in the predetermined direction, determine whether or not a number of one or more unexecuted commands that include a logical address within the first sub-range and for which the calculation has been carried out is lower than a minimum evaluation threshold, and when the number of the one or more unexecuted commands that include a logical address within the first sub-range and for which the calculation has been carried out is lower than the minimum evaluation threshold, set the flag.

22. The method according to claim 12, further comprising:

when there is no sub-range that is adjacent to the first sub-range in the predetermined direction, determining whether or not a number of one or more unexecuted commands that include a logical address within the first sub-range and for which the calculation has been carried out is lower than a minimum evaluation threshold, wherein the flag is set when the number of the one or more unexecuted commands that include a logical address within the first sub-range and for which the calculation has been carried out is lower than the minimum evaluation threshold.

* * * * *